TRAFFIC RECORDER

Filed March 28, 1958 6 Sheets-Sheet 1

INVENTOR
A. ZAROUNI
BY
Harold C. Herman
ATTORNEY

July 31, 1962 A. ZAROUNI 3,047,665

TRAFFIC RECORDER

Filed March 28, 1958 6 Sheets-Sheet 2

INVENTOR
A. ZAROUNI

BY

Harold C. Herman
ATTORNEY

July 31, 1962 A. ZAROUNI 3,047,665

TRAFFIC RECORDER

Filed March 28, 1958 6 Sheets-Sheet 3

INVENTOR
A. ZAROUNI
BY
Harold C. Herman
ATTORNEY

INVENTOR
A. ZAROUNI
BY Harold C. Herman
ATTORNEY

INVENTOR
A. ZAROUNI
BY
Harold C. Herman
ATTORNEY

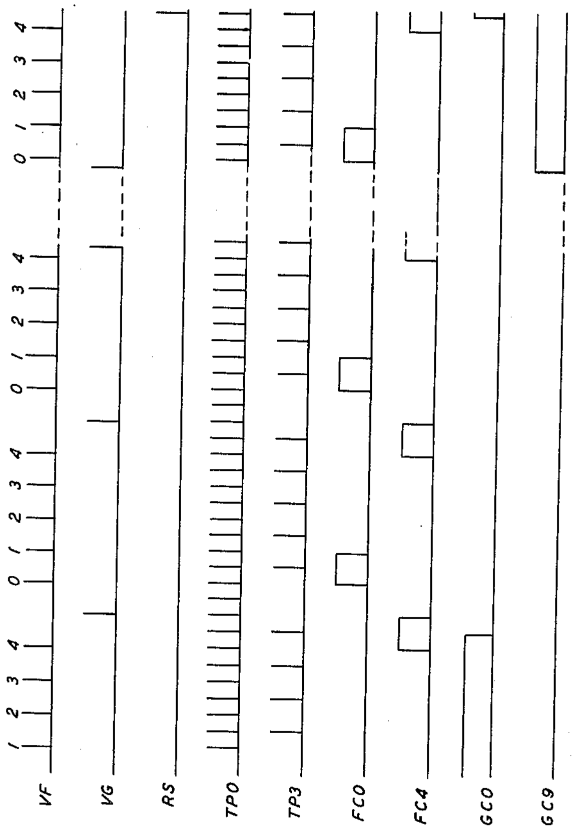
FIG. 7
FIG. 8
| VG | TRUNKS | | | | | |
|---|---|---|---|---|---|---|
| 0 | 3 | 2 | 1 | 0 | 8 | 9 |
| 1 | 6 | 7 | 0 | 1 | 8 | 9 |
| 2 | 2 | 3 | 4 | 5 | 8 | 9 |
| 3 | 0 | 1 | 2 | 3 | 8 | 9 |
| 4 | 4 | 0 | 5 | 1 | 8 | 9 |
| 5 | 6 | 4 | 7 | 5 | 8 | 9 |
| 6 | 5 | 7 | 4 | 6 | 8 | 9 |
| 7 | 1 | 5 | 0 | 4 | 8 | 9 |
| 8 | 2 | 6 | 3 | 7 | 8 | 9 |
| 9 | 7 | 3 | 6 | 2 | 8 | 9 |
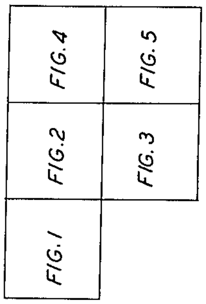
FIG. 6
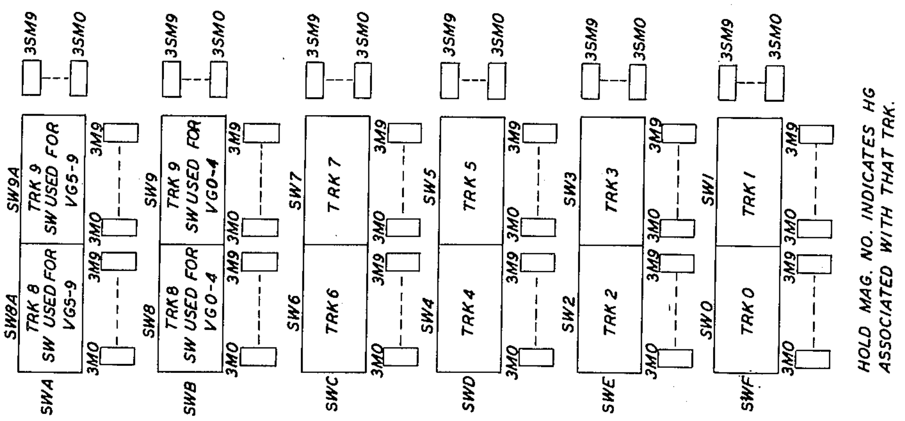
FIG. 9
INVENTOR
A. ZAROUNI
BY Harold C. Herman
ATTORNEY United States Patent Office 3,047,665
Patented July 31, 1962

3,047,665

TRAFFIC RECORDER

Alfred Zarouni, Brooklyn, N.Y., assignor to Bell Telephone Laboratories, Incorporated, New York, N.Y., a corporation of New York Filed Mar. 28, 1958, Ser. No. 724,559
9 Claims. (Cl. 179—8)

This invention relates to traffic recorder equipment and more particularly to automatic traffic recorder equipment for use in line concentrator telephone systems.

In automatic telephone switching systems it is desirable to determine the busy and idle conditions of the various lines, trunks and circuits in order to provide optimum service consistent with economy of operation. The traffic information is utilized to determine how many trunks, circuits and switching devices are needed to handle a given volume of traffic without reducing the quality of telephone service. When the subscriber lines terminate at the central office, it is a relatively simple matter to provide for the automatic sampling and recording of the busy and idle conditions of the lines because direct connections can readily be provided to the subscriber lines. In line concentrator telephone systems, however, a large number of subscriber lines terminate in a line concentrator which is connected by a small number of concentrator trunks to the central office. The central office is not directly in information communication with the subscriber lines due to the interposition of the remote line concentrator so that direct connections from the central office to the subscriber lines are not possible.

Providing traffic sampling and recording facilities for line concentrators is particularly important because concentrators present several unprecedented traffic problems: first, the concentrator serves lines from customers in a relatively small geographical area so that the characteristics of the telephone-call traffic from this area usually differs from the office average; second, the use of remote concentrators introduces a new objective in traffic administration by requiring the assignment of lines as concentrated and unconcentrated to provide for a maximum saving of cable; and third, the use of concentrators requires measurement of the usage of individual lines to achieve the desired efficiency while maintaining on concentrated lines the same traffic service given to non-concentrated lines.

It is a general object of this invention to provide for traffic sampling and recording facilities for subscriber lines in a line concentrator telephone system.

Another object of this invention is to provide traffic sampling and recording equipment for line concentrator telephone systems without effectively reducing the quality of the telephone service provided to the concentrator subscriber lines.

Still another object of this invention is to sample and record the traffic conditions of subscriber lines in a line concentrator telephone system without signaling to or from the remote concentrator.

A further object of this invention is to avoid the necessity of a signaling sequence or the utilization of any of the concentrator trunks for sampling and recording line traffic conditions in a line concentrator system.

In line concentrator systems of the type described in the Patent 2,812,385 issued to Joel-Krom-Posin on November 5, 1957, a scanning system is utilized which cyclically scans the subscriber lines to determine idle, busy and service request conditions. The scanning system determines the service condition of the lines and supplies indications thereof to the central office.

A further object of this invention is to avoid the utilization of the line concentrator scanning signaling system for sampling the traffic conditions of the concentrator lines.

Still a further object of this invention is to provide traffic sampling facilities for a line concentrator system without interrupting normal scanning.

Still a further object of this invention is to provide traffic sampling facilities which automatically isolates itself from the line concentrator system in the event of a fault so that normal concentrator operation is not inhibited.

In an illustrative embodiment of this invention, the foregoing objects are accomplished by the provision of traffic sampling and recording equipment which is located at the central office. The traffic sampling and recording equipment functions to sample and record the traffic conditions of subscriber lines in a line concentrator telephone system. The line concentrator system includes a central office memory circuit which is utilized by the traffic sampling and recording equipment and which functions to maintain a record of the connections established at the remote line concentrator. Whenever a connection is established at the line concentrator, the memory circuit in the central office records an indication of the line and trunk identities of the line and trunk utilized for the connection. Whenever a connection is released at the concentrator, the memory circuit erases its registration of the line and trunk identities.

A feature of this invention relates to means for scanning the line concentrator memory circuit to sample the line traffic conditions thereby avoiding a signaling operation to and from the remote line concentrator. In the memory circuit, a read-out circuit is provided for each of the concentrator trunks. The read-out circuits are controlled by a pulse generator which also drives the line concentrator scanning system. During periodic traffic sampling intervals, the pulse generator supplies line identifying pulses to a number of crossbar switches in the memory circuit. The crossbar switches, which register the identities of busy lines and busy trunks, provide enabling paths for the line identifying pulses of busy lines to enable the read-out circuits. When a read-out circuit is enabled, it provides a line busy indication to the recording equipment which also receives from the pulse generator an indication of the identity of the subscriber line which is being sampled. The busy indication and the line identifying indication are simultaneously recorded on a magnetic tape.

Another feature of this invention pertains to the provision of a mutual lockout arrangement between the connection establishing equipment in the line concentrator system and the traffic sampling and recording equipment. If a connection is being established, sampling traffic conditions are delayed, and if the traffic conditions are being sampled, originating and terminating calls are delayed.

Still another feature of this invention relates to means for automatically releasing the marker lockout circuit in the event of a fault so that normal concentrator operation can take place.

A further feature of this invention pertains to means for halting the movement of the magnetic tape in the event of a fault even though marker lockout has not taken place.

Further objects and features will become apparent upon consideration of the following description taken in conjunction with the drawings wherein:

FIG. 2 illustrates the frame control circuit at the central office;

FIGS. 3 and 5 illustrate the memory circuit at the central office; and

FIG. 4 illustrates the recorder equipment at the central office;

FIG. 6 illustrates the arrangement of FIGS. 1 through 5;

FIG. 7 illustrates the pulse sequence provided by the central office pulse generator;

FIG. 8 illustrates in tabulated form the line concentrator trunk connections; and FIG. 9 illustrates the crossbar switch arrangement in the memory circuit.

Figure 1:
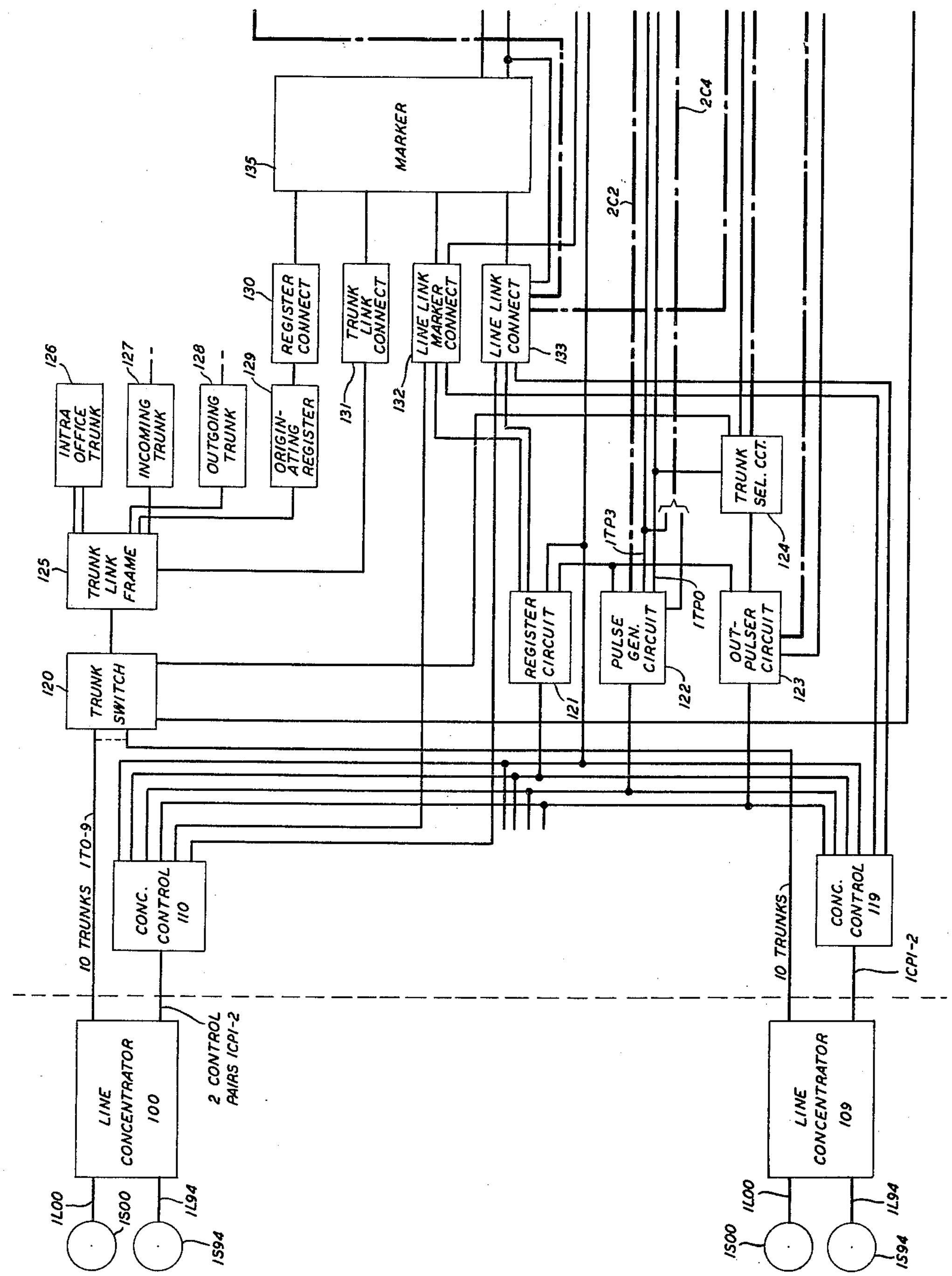
FIGS. 1 through 5 are a circuit representation of one embodiment of a traffic recorder and line concentrator system illustrative of this invention wherein FIG. 1 functionally illustrates the line concentrators and a number of common control circuits at the central office.

Referring to FIGS. 1 through 5, when arranged in accordance with FIG. 6, the first digit of each of the reference numbers generally indicates the figure in which the component appears. For example, the line concentrator 100 appears in FIG. 1. The line concentrator telephone system, which includes the line concentrator 100 and nine other concentrators 101–9, is described in Patent 2,894,072 issued to Abbott-Krom-Mehring-Whitney of July 7, 1959. Functionally a portion of the line concentrator system becomes part of the recorder equipment when the traffic conditions are being sampled.

Before proceeding with the description of the sampling and recording sequence of operations, the operation of the line concentrator system is briefly described with emphasis upon the operation of a frame control circuit 210, a central office memory circuit 300 and a pulse generator circuit 122 which are utilized in the traffic sampling sequence of operations.

*Concentrator Operation*

The line concentrator system is utilized to concentrate the traffic from ten sets of fifty subscriber stations 1S00, etc. Of the fifty stations 1S00, etc. connected to each of the line concentrators 100–9 only the stations 1S00 and 1S94 are shown. The designations of the substations identify the vertical group and the vertical file of the substation. These terms, which are hereinafter described, identify the time position of the substations in a scanning cycle. The last digit of each designation indicates the vertical file identity and the next-to-last digit indicates the vertical group identity. For example, the substation 1S94 has a vertical group of 9 and a vertical file of 4. The ten line concentrators 100–9 provide for connections from the groups of fifty substations 1S00, etc. to groups of ten talking trunks 1T0–9.

The effect of utilizing the line concentrators 100–9 is to place a part of the switching equipment of the central office at a distance therefrom. Each of the line concentrators 100–9 is connected to the central office by one of the groups of ten trunks 1T0–9 and by two control pairs 1CP1–2. The trunks 1T0–9 provide talking paths between the line concentrators 100–9 and the central office, and the control pairs 1CP1–2 provide for signaling paths to and from the central office equipment. With fifty subscriber stations connected to each of the ten concentrators 100–9 there are a total of 500 stations which are served by the central office equipment. The stations 1S00, etc. are connected, respectively, by the lines 1L00, etc. to their associated concentrators 100–9.

With all 500 subscriber lines idle, the central office continuously and synchronously scans the ten groups of fifty subscriber lines connected respectively to the ten concentrators 100–9 in order to detect service requests. The ten line concentrators 100–9 are synchronously operated under control of a pulse generator 122 which simultaneously provides scanning pulses in parallel through ten concentrator control circuits 110–9 and the ten sets of control pairs 1CP1–2 to the ten line concentrators 100–9. The pulse generator 122 also supplies the scanning pulses to a register circuit 121 which is synchronously operated with the line concentrators 100–9. The concentrator control circuits 110–9 are individually associated with the concentrators 100–9, and the pulse generator 122 and the register 121 are common control equipment for all ten concentrators 100–9.

As in ordinary crossbar telephone systems the subscriber lines are arbitrarily arranged in groups designated vertical groups, vertical files and horizontal groups. All the subscriber lines connected to one of the ten concentrators 100–9 are in the same horizontal group and each horizontal group is subdivided into ten vertical groups each of which includes five vertical files. The pulse generator 122 supplies five types of pulses which are illustrated in FIG. 7: vertical file pulses; vertical group pulses; reset pulses; and two types of timing pulses. The vertical group pulses select a group of five lines connected to each of the concentrators 100–9. Between two such vertical group pulses the pulse generator 122 supplies five vertical file pulses to select one subscriber line connected to each of the ten concentrators 100–9. In order to scan the 500 lines, the pulse generator 122 provides to each of the ten concentrators 100–9 and to the register 121 ten vertical group pulses spaced at intervals of 24 milliseconds and, between each pair of vertical group pulses, five vertical file pulses spaced at intervals of 4 milliseconds. The complete scanning cycle has a duration of 240 milliseconds.

In addition ot the vertical group pulses and the vertical file pulses the generator 122 supplies one reset pulse at the beginning of each cycle to insure the synchronous operation of the line concentrators 100–9 and the register 121 with the generator 122. Each reset pulse also functions as the first vertical group pulse so that only nine vertical group pulses are provided instead of ten during each scanning cycle. As is hereinafter described, the reset pulses are also utilized during periodic sampling intervals to synchronize the recorder 400 with the generator 122.

During each scanning cycle, therefore, the generator 122 supplies one reset pulse, nine vertical group pulses and fifty vertical file pulses. The generator 122 also supplies timing pulses TP0 and TP3 at a rate of 500 and 250 pulses per second, respectively, which are utilized for traffic sampling and when a call to or from one of the 500 subscriber lines is served. These sequences are hereinafter described.

At each of the line concentrators 100–9, the scanning pulses function cyclically to determine the service conditions of the fifty lines 1L00, etc. connected thereto. In each of the line concentrators 100–9 each vertical group pulse prepares for scanning five lines and each vertical file pulse scans one of the five lines in the group. The lines are successively scanned by the vertical file pulses so that service requests initiated at the line concentrators 100–9 can be identified at the register 121 on a time basis.

Figure 2:
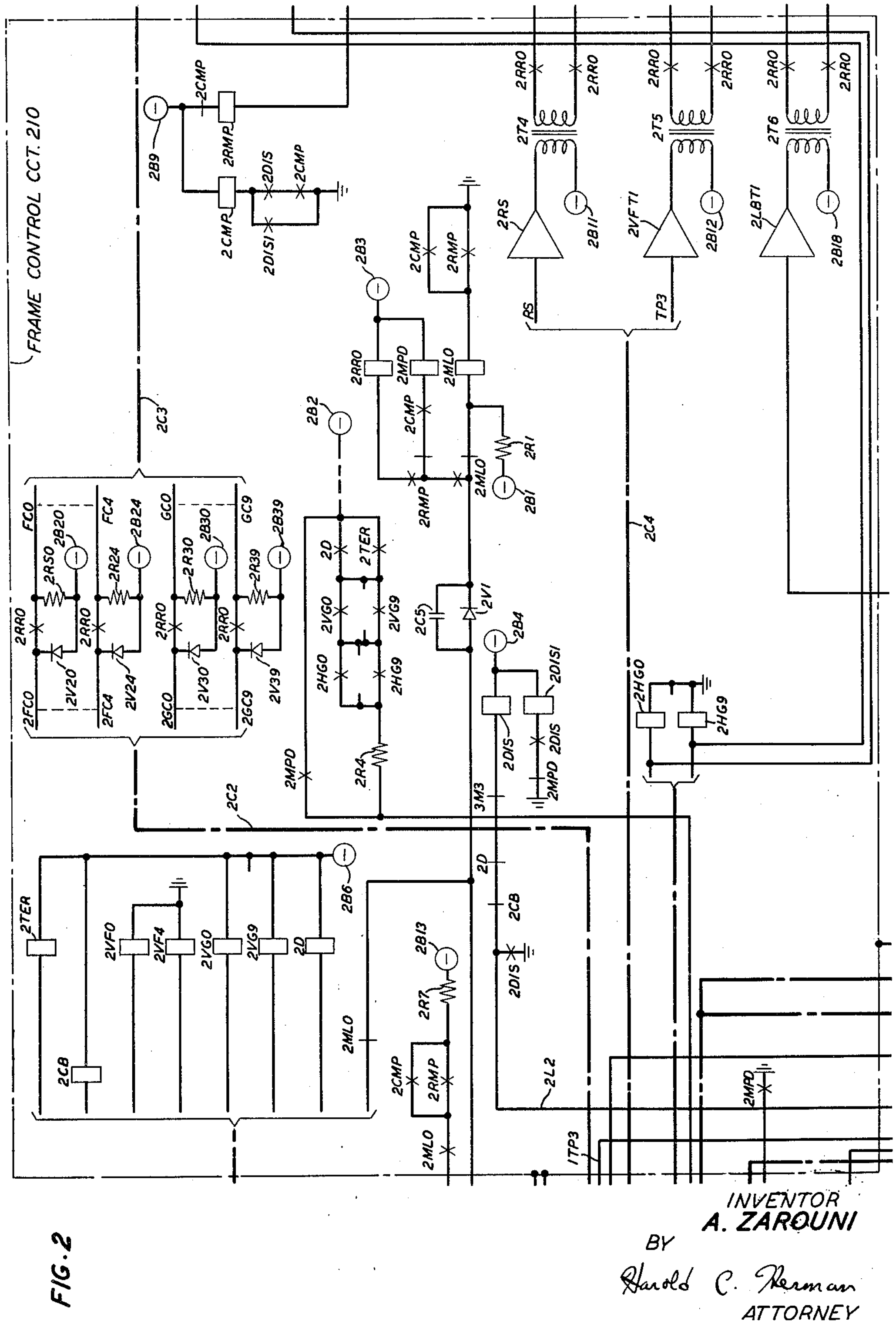

When a service request is initiated at any one of the ten sets of fifty lines 1L00, etc., the vertical file pulse identifying it is transformed by the associated one of the line concentrators 100–9 to a service request pulse which is sent back through the control pairs 1CP1–2 to the central office. Assume, for example, that a service request is initiated at the line 1L00 of the line concentrator 100. The service request pulse from the line 1L00 is supplied through the control pairs 1CP1–2 to the concentrator control circuit 110 in the central office. The control circuit 110 registers the identity of the concentrator 100 from which the service request is initiated and it starts a sequence of operations for establishing a connection from the service requesting line 1L00 through one of the trunks 1T0–9, a trunk switch 120 and a trunk link frame 125 to an originating or dial-tone register 129. More specifically, the concentrator control circuit 110 halts line scanning by blocking the scanning pulses from the generator circuit 122, and it stops the register circuit 121 at the identity of the calling line 1L00. The circuit 110 also supplies the identity of the service requesting concentrator 100, which is the horizontal group 0, to a frame control circuit 210. The frame control circuit 210 functions as a buffer between the common control equipment such as connectors 130–133 and the central office common control equipment associated with the line concentrators 100–9. The connectors 130–33, a marker 135 and associated equipment are disclosed in the Patent 2,585,904, granted to A. J. Busch on February 19, 1952, and the frame control circuit 210 is disclosed in the above-identified disclosure by Abbott-Krom-Mehring-Whitney. A modified portion of the frame control circuit 210 illustrating the circuitry utilized during the sampling and recording sequences is illustrated in FIG. 2.

When the register 121 is stopped, it supplies the vertical file and the vertical group identities of the service requesting line 1L00 to the frame control circuit 210. When the frame control circuit 210 receives the horizontal group identity and the line identity, it provides a start or request signal through the marker connector 132 to the marker 135. When the marker 135 receives the start signal, it seizes the dial-tone or originating register 129 through the connector 130 in preparation for connecting it to the calling line 1L00 and it supplies the calling line information, together with an indication that the call is an originating call, back through the line link connector 133 to the frame control circuit 210.

In the circuit 210, operating paths are completed for the relays 2HG0, 2VF0, 2VG0 and 2D. The relays 2HG0 and 2VF0 are operated over paths to ground, and the relays 2VG0 and 2D are operated over a path to battery 2B6. The relays 2HG0, 2VG0 and 2VF0 identify, respectively, the horizontal group, vertical group and vertical file of the calling line 1L00 and relay 2D indicates that the call being served is an originating or dial-tone call. All types of calls are handled in a similar manner after the marker 135 is seized except that relay 2D is operated for a dial-tone call, relay 2TER for a terminating call and relay 2CB for a callback call.

When the frame control circuit 210 receives the information from the marker 135, it operates a trunk selector circuit 124 to select one of the trunks 1T0–9 connected to the concentrator 100, it initiates a line busy check in the memory circuit 300, and it readies the central office and the line concentrator 100 for outpulsing the identities of the selected trunk and the calling line to the concentrator 100. The selector circuit 124, which is disclosed in Patent 2,991,449, issued to B. W. Lee, on July 4, 1961, is operated when it receives a start potential due to the connection of battery 2B2 through serially connected operated contacts of relays 2D, 2VG0 and 2HG0 and the resistor 2R4 thereto.

In addition to the start potential from the circuit 210, the selector circuit 124 utilizes a timing pulse from the pulse generator 122 through lead 1TP0, and trunk availability information from the memory circuit 300. The trunk availability information indicates which trunks are connectable to the calling line 1L00 and which of the connectable trunks are idle. Only six of the trunks 1T0–9 are available for connection to any one of the lines 1L00, etc. and a selection preference is established wherein trunks 1T8 and 1T9 are always the last two preferred trunks. The trunks available for each line and the selection preference established by the circuit 124 is illustrated in FIG. 8. The preference is indicated from left to right and the six connectable trunks, which are referred to as a trunk multiple, are the same for all five lines in each vertical group. In all there are ten different trunk multiples, one for each vertical group. A trunk multipling system of this type is disclosed in the above-identified disclosure by B. W. Lee and also in the C. E. Brooks et al. Patent 2,853,554, issued on September 23, 1958, and in the A. E. Joel, Jr. et al. Patent 2,812,385 issued on November 5, 1957. The circuitry in the memory circuit 300, which supplies the trunk availability information to the circuit 124, is disclosed in the above-identified disclosure by Abbott-Krom-Mehring-Whitney. Only a portion of the memory circuit 300, as modified for use in the traffic sampling and recording sequence, is shown herein.

The memory circuit 300 includes six 200 point crossbar switches 3SWA–F which store a record of each established call or connection through the line concentrators 100–9. The assignment of the trunks 1T0–9 of each of the concentrators 100–9 to the switches 3SWA–F is illustrated in FIG. 9. The hold magnets designated 3M0–9 in FIG. 9 and 3M0–9 in FIGS. 3 and 5 identify the horizontal group or concentrator identity. For example, if trunk 1T3 of the line concentrator 100 is busy, the magnet 3M0 (identifying concentrator 100) of the switch 3SW3 (identifying trunk 1T3) is operated. The switch 3SW3 is one-half of the switch 3SWB. Each of the switches 3SWA–F has two halves which are separately identified to indicate the trunk number of the information stored therein. Switch 3SW3, for example, stores the information relating to all ten trunks 1T3 connected respectively to the line concentrators 100–9.

Each of the trunks 1T0–7 of each of the concentrators 100–9 is assigned one vertical of the eighty verticals in switches 3SW1–7. Each of the trunks 1T8–9 of each of the concentrators 100–9 is assigned two verticals of the forty verticals in switches 3SWE–F because they are common to all ten vertical groups. Trunks 1T0–7 are connected on a random slip basis with only four being available to each vertical group. Each of the trunks 1T0–7 is accessible to five vertical groups and each of trunks 1T8–9 is accessible to all ten vertical groups.

When a connection is established through any one of the line concentrators 100–9, the select magnets 3SM0–9 are selectively operated to register the vertical file and vertical group identities of the line and one of the hold magnets 3M0–9 is operated to register the identity of the trunk utilized for the call. The operating paths for the hold magnets 3M0–9 and the select magnets 3SM0–9 are not shown herein as they are described in the above-identified disclosure by Abbott-Krom-Mehring-Whitney. The trunk availability information is supplied to the selector circuit 124 through contacts of the hold magnets 3M0–9. The paths through the contacts of the hold magnets 3M0–9, which are not shown herein, are also disclosed in the above-identified disclosure by Abbott-Krom-Mehring-Whitney.

During the time that the trunk availability information is supplied to the selector 124, the memory circuit 300 performs a line busy test. When the call being served is an originating call, the line busy test is unnecessary but it is required for terminating calls and all calls are handled in the same manner from the time the marker 135 is seized. As is hereinafter described during the description of the sequence of operation for handling a terminating call, if the line is busy, outpulsing is inhibited and the concentrator system including the circuit 124 is reset.

The selector circuit 124 utilizes the trunk availability information from the circuit 300 to select the first available preferred trunk. Suppose, for example, that trunks 1T3, 1T2 and 1T1 of concentrator 100 are busy but that trunk 1T0 is idle. With the first three preferred trunks for the vertical group 0 unavailable, the fourth preferred trunk 1T0, which is available, is selected. The selected trunk identity is supplied by the circuit 124 to the trunk switch 120 and to the memory circuit 300. The switch 120 is readied to connect the trunk 1T0, through the trunk link frame 125 to the originating register 129, and the memory circuit 300 functions to register the calling line and selected trunk identities. The line information is supplied to the memory circuit 300 from the circuit 210 when it initiates the line busy test. As is hereinafter described, the switch 120 completes the dial-tone connection after a memory check indication of the registration of the line and trunk information is provided thereto from the circuit 300.

In the memory circuit 300, the vertical group information is stored on the first five levels of the switch vertical and varies in accordance with the identity of the selected trunk. The vertical file information is stored on the last four levels 6–9. For example, for a vertical file of 0 and a selected trunk 1T0, the select magnet 3SM9 of switch 3SWA on the last level is operated. In this manner, two crosspoints are closed; one for the vertical group and one for the vertical file. Only two crosspoints are closed if the file number of the line is 0, 1 or 2 and three crosspoints are closed if the file number is 3 or 4. If the vertical file number is 3, for example, the select magnets 3SM9 and 3SM6 are operated.

For the illustrative call being described herein, which originates at line 1L00 of the concentrator 100, the select magnet 3SM0 of switch 3SWA is operated to identify the vertical group 0 and the select magnet 3SM9 of switch 3SWA is operated to identify the vertical file 0. With these two select magnets operated, the memory hold magnet 3M0 of switch 3SW0 is operated to identify the trunk 1T0 of the line concentrator 100. The hold magnet 3M0 remains operated storing the line and trunk information until, as is hereinafter described, the subscriber of station 1S00 disconnects.

Figure 3:
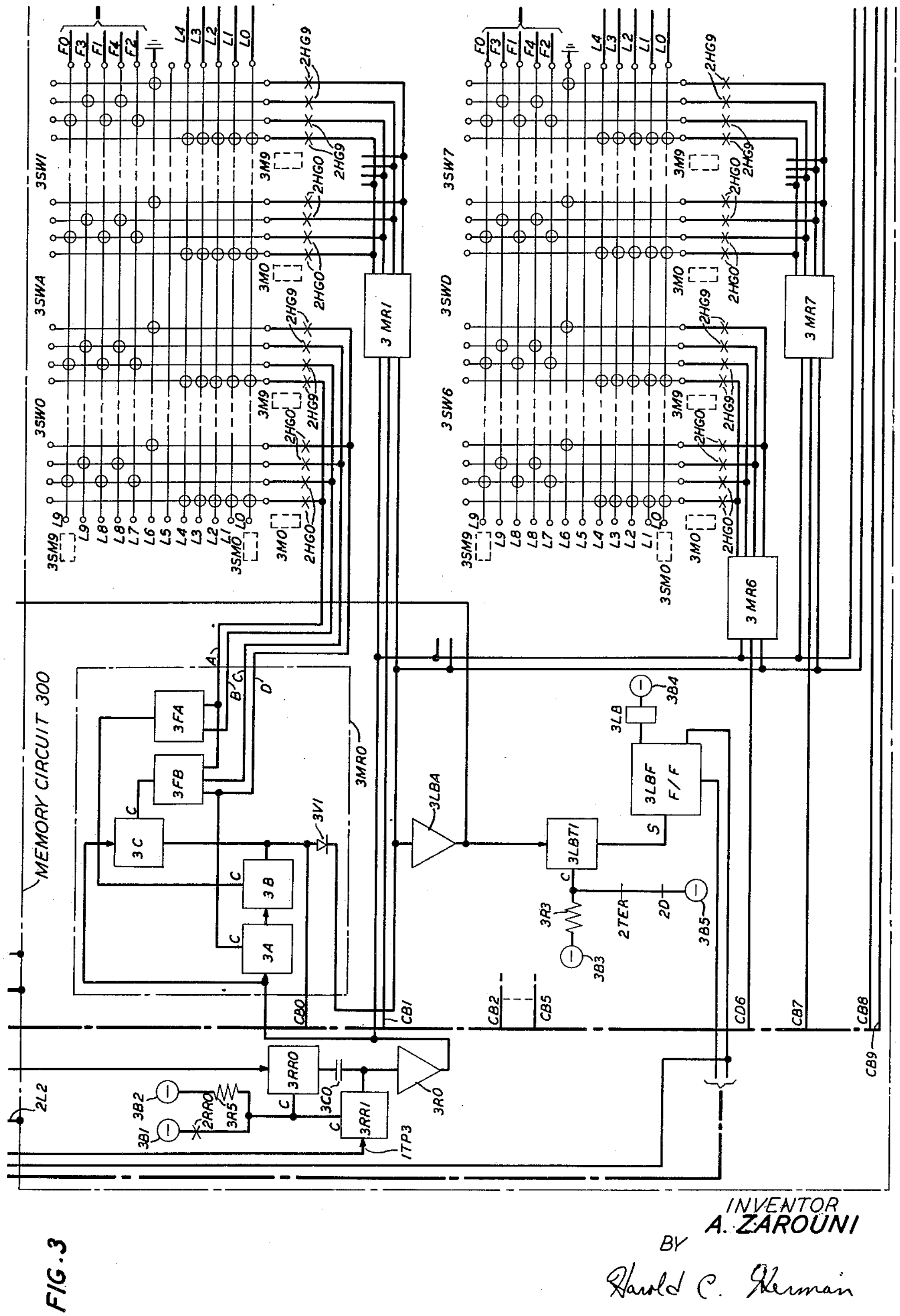
Figure 4:
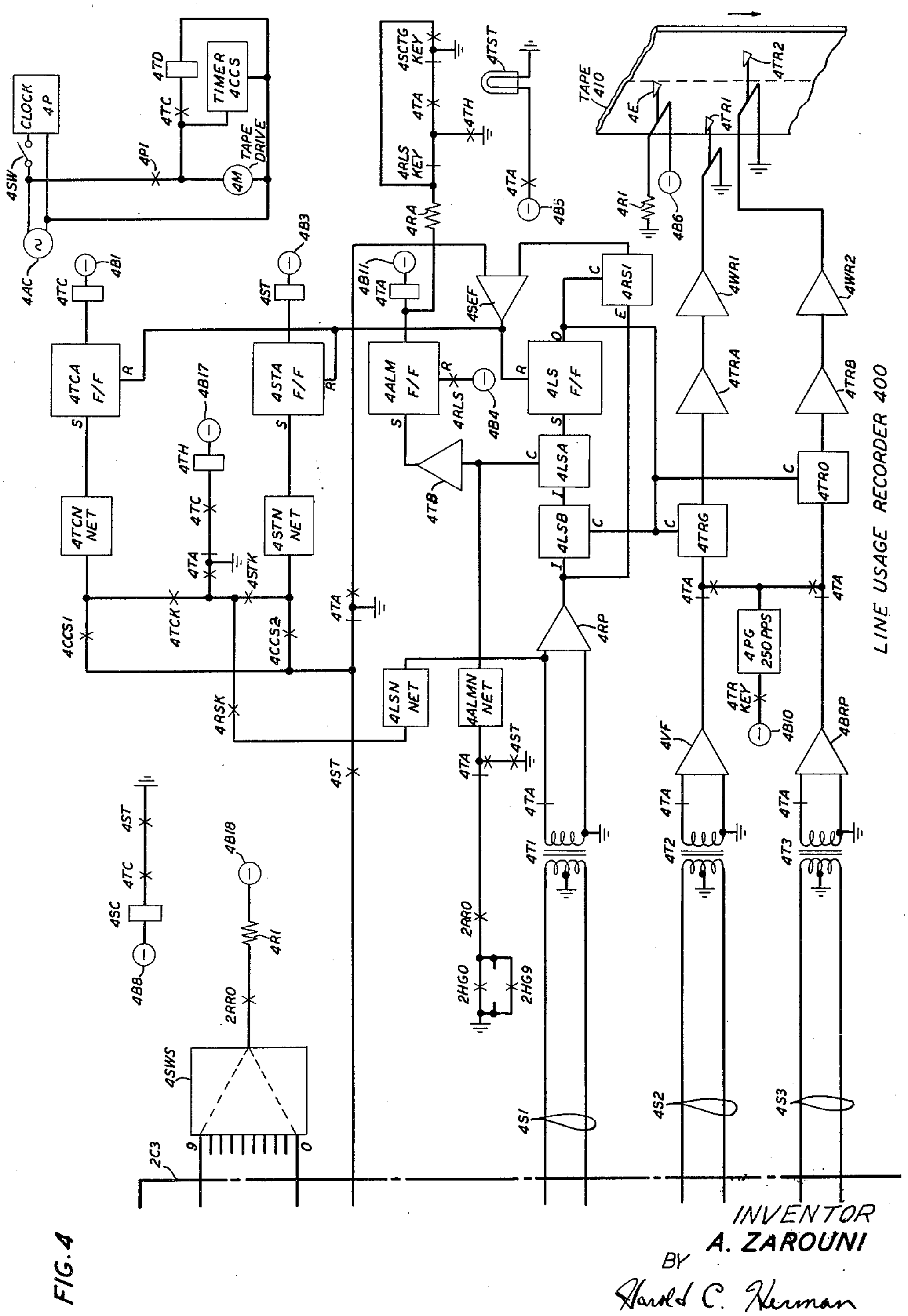

When the hold magnet 3M0 of switch 3SW0 operates, it readies a path through a memory read-out circuit 3MR0 to the line busy amplifier 3LBA. The circuit 3LBA and a number of flip-flop circuits, gates, etc. are conventional in the art being disclosed, for example, in the above-identified patent by A. E. Joel, Jr., et al. There are ten memory read-out circuits 3MR0–9 in the memory circuit 300, each of which is associated with ten trunks having similar designations but connected respectively to the concentrators 100–9. For example, the memory read-out circuit 3MR0 is associated with the ten trunks 1T0 connected respectively to the concentrators 100–9. The memory read-out circuits 3MR0–9 are multipled through to a line busy amplifier 3LBA and a gate 3LBT1 to a flip-flop circuit 3LBF. With the relay 2HG0 operated, the verticals of the switches 3SWA–F, which are associated with the line concentrator 100, are connected to the circuits 3MR0–9. For example, as shown in FIG. 3, relay 2HG0 connects the four leads of the 0 or left vertical of switch 3SW0 to the memory read-out circuit 3MR0. The other nine verticals of the switch 3SW0 remain unconnected to the memory read-out circuits 3MR0–9.

The function of the read-out circuits 3MR0–9 is to interpret the information that has been stored in the memory switches 3SWA–F. Each of the memory read-out circuits 3MR0–9 includes a two-terminal AND gate 3FA and a three-terminal AND gate 3FB which are respectively enabled when all their input terminals are at ground potential. When either of the AND gates 3FA or 3FB is enabled, it in turn enables, respectively, gates 3B and 3C. There are four input leads A through D which are connected to the terminals of the AND gates 3FA–B; the input terminal A being multipled to both AND gates 3FA–B; the input lead B to the gate 3FA; and the input leads C and D to the gate 3FB. The input leads A–D are connected by the operated contacts of the relay 2HG0 to the vertical associated with trunk 1T0 in the switch 3SW0. The voltage upon the leads A to D of each read-out circuit 3MR0 depends upon the state of the switches 3SWA–F and the number of the service requesting line. With the switch 3SWA operated due to the operation of the select magnets 3SM0 and 3SM9 of switch 3SWA and the hold magnet 3M0 of switch 3SW0, two paths through the switch 3SWA to the leads A–D are completed. Ground potentials are provided to a combination of the input leads A through D of the read-out circuit 3MR0 in accordance with the identity of the calling line. The following table indicates which leads are grounded and which gates in the memory read-out circuit 3MR0 are enabled:

| The Vertical File Number | Potential | | | | Enabled Gates |
|---|---|---|---|---|---|
| | A | B | C | D | |
| 0, 1 or 2 | Ground | | | Ground | FA, B, A |
| 3 or 4 | | Ground | Ground | do | FB, C |

Figure 5:
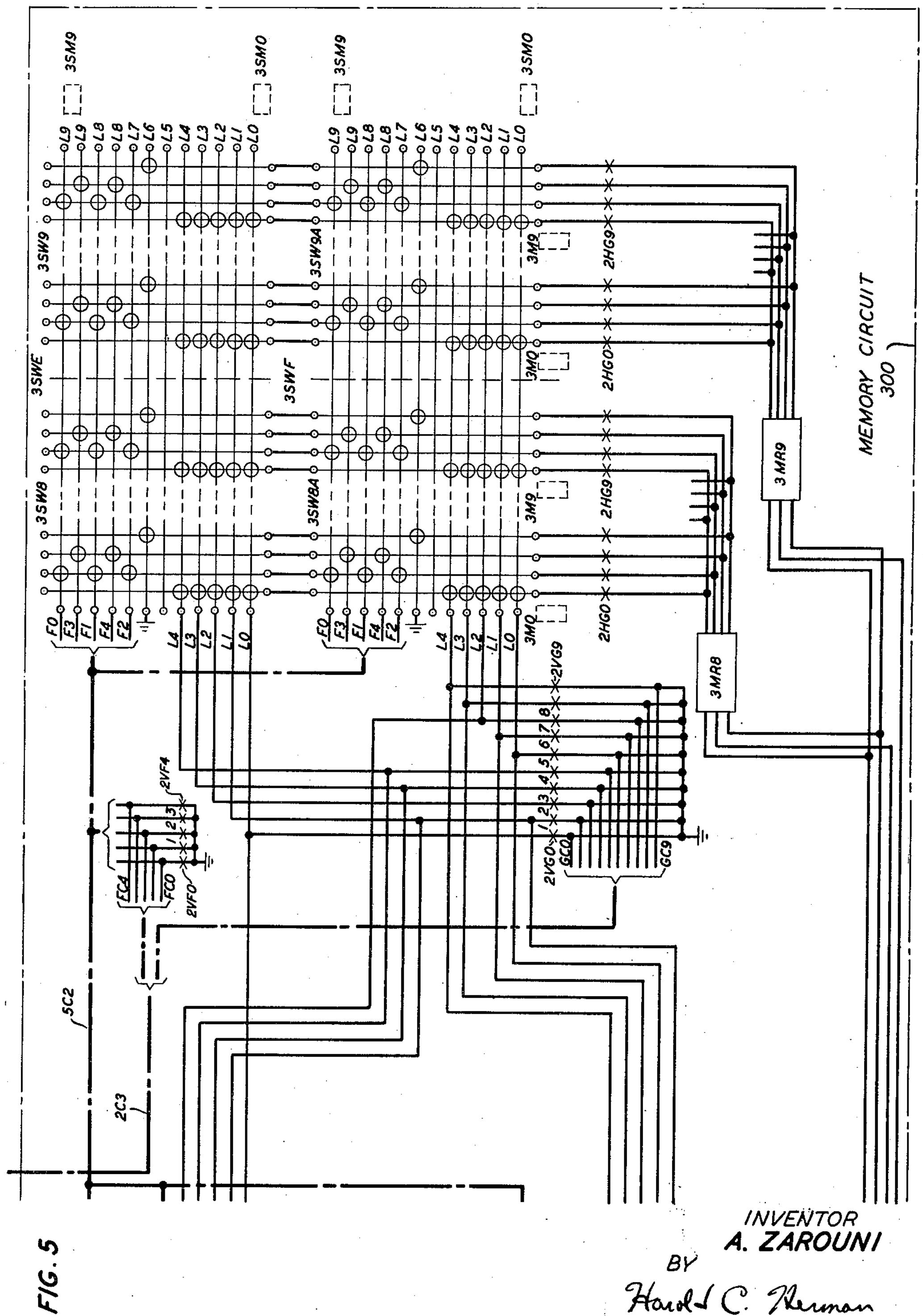

With relays 2VF0 and 2VG0 operated, paths are closed from ground shown in FIG. 5 to the horizontals of the crossbar switch 3SWA. More specifically, ground is provided through an operated contact of relay 2VF0, lead F0 of the switch 3SWA through the operated crosspoint furthest to the left on level 9 (designated at the left), an operated contact of relay 2HG0 to lead B of the memory read-out circuit 3MR0. Ground through an operated contact of relay 2VG0 is connected through an operated crosspoint on level 0 of the switch 3SWA and an operated contact of relay 2HG0 to the lead A of the circuit 3MR0. The grounded contacts of relays 2VG0–9 in FIG. 5 are connected to the horizontals or levels of the crossbar switches 3SWA–F in accordance with trunk multipling system illustrated in FIG. 8. For example, the grounded contact of relay 2VG0 is connected to switches 3SW3, 3SW2, 3SW1, 3SW0, 3SW8 and 3SW9. An output pulse is provided through a varistor 3V1 in the memory read-out circuit 3MR0 to the line busy amplifier 3LBA when a gate 3C is enabled or when two gates 3A and 3B are enabled. The gate 3A is an inhibiting gate which remains enabled as long as a control potential is not provided thereto. With ground potential upon leads A and B, the AND gate 3FA is enabled to in turn enable the gate 3B. The inhibiting gate 3A remains enabled to complete a path from a lead 1TP3 of the pulse generator 122, through an inhibiting gate 3RR1, a read-out amplifier 3R0 and the circuit 3MR0 to the amplifier 3LBA.

The amplified pulse from the amplifier 3LBA is provided through the inhibiting gate 3LBT1 to the input terminal S of the flip-flop circuit 3LBF. When the circuit 3LBF operates, it in turn operates its associated relay 3LB and it provides a check pulse to the outpulsing control circuit 123 and to the switch 120.

As described above, when the frame control circuit 210 is seized by the marker 135, it readies the central office for outpulsing the line and selected trunk identities. The circuit 210 initiates the outpulsing sequence by operating the concentrator control circuit 110. When the concentrator control circuit 110 is operated by the circuit 210, it readies outpulsing paths from an outpulsing control circuit 123 to the control pairs 1CP1–2 and it provides a start potential to the circuit 123. Responsive thereto the circuit 123 supplies a reset pulse to the line concentrators 100–9 to ready them for the reception of the outpulsed information. Thereafter, if a line busy indication is not received from the memory circuit 300, trunk and line identifying signals are outpulsed from the circuit 123 to the concentrator 100.

With the reset pulse provided to the concentrator 100, and with an idle test indication received from the memory circuit 300, the circuit 123 supplies to the selector circuit 124 timing pulses received from the pulse generator 122. The timing pulses are utilized at the selector circuit 124 to supply an indication of the selected trunk identity through the circuit 123, the circuit 110 and the control pairs 1CP1–2 to the line concentrator 100.

At the same time that the trunk identity is being supplied to the concentrator 100, the circuit 123 outpulses the vertical group identity. The line information is supplied to the circuit 123 from the frame control circuit 210 after the circuit 210 is seized by the marker 135. The vertical group outpulsing is concurrent with the trunk outpulsing as both utilize the same timing pulses from the pulse generator 122. To identify the selected trunk 1T0, one pulse is provided to the concentrator 100. If the selected trunk was trunk 1T1, two pulses would be provided to the concentrator 100, etc. For the vertical group 0, no pulses are provided to the concentrator 100 because it is set to identify the vertical group 0 when it is reset or normalized by the outpulsing control circuit 123. If the vertical group was 1, one pulse would be provided, etc.

When both the trunk and vertical group outpulsing is completed, the outpulsing control circuit 123 supplies the vertical file identity to the line concentrator 100. For the vertical file identity 0, five vertical file pulses are provided to the line concentrator 100. If the vertical file identity was 1, a single pulse would be provided; for a vertical file identity of 2, two pulses would be provided, etc. Five pulses are sent for vertical file 0 because the first vertical file pulse performs a dual function. In addition to being part of the vertical file signal, it also sets the line concentrator 100 for the reception of mark pulses. The control pair 1CP2 is utilized for both trunk and mark pulses which are both of the same polarity. The first vertical file pulse indicates to the concentrator 100 that trunk outpulsing is completed and that subsequent pulses of the same polarity as the trunk pulses through the control pair 1CP2 are mark pulses. With the selected trunk and line identities outpulsed to the concentrator 100, it is ready for crosspoint closure by the central office mark pulses. The mark pulses are supplied from the circuit 123 when it receives the memory registration check pulse from the circuit 300. The memory check pulse initiates mark pulsing and it also operates the switch 120 to complete the connection from the trunk 4T0 to the register 129. The mark pulses from the circuit 123 are supplied through the circuit 110 and the control pair 1CP2 to operate the concentrator 100.

When the connection is established at the line concentrator 100 from trunk 1T0 to the calling line 1L00, a crosspoint closure indication is supplied from the concentrator 100 through the control pair 1CP1, the circuit 110 to the circuit 123 to halt the supply of the mark pulses to the line concentrator 100. The crosspoint closure indication in combination with a crosspoint closure indication from the trunk switch 120 causes the control circuit 123 to initiate a reset sequence returning the central office and the concentrators 100–9 to normal. When the trunk switch 120 receives the memory check pulse and operates to establish a connection from the trunk 1T0 through the switch 120 and the trunk link frame 125 to the originating register 129, it provides a crosspoint closure indication to the outpulsing control circuit 123. When the marker 135 establishes the connection through the trunk switch 120 to the register 129, it releases and in turn releases the connectors 133 and 132 and the relays 2VG0, 2VF0, 2HG0, and 2D in the circuit 210. When these relays release, the circuits 124, 123, 121 and 300 are restored to normal. The registration of the line and trunk identities remains in the circuit 300 for the duration of the call.

The sequence of operations for establishing a terminating connection responsive to a call to one of the subscriber lines 1L00, etc. is substantially the same as the sequence of operations for an originating call. The two main exceptions in the sequence involve making a line busy test in the memory circuit 300 and providing the trunk overflow indication from the trunk switch 120 to the marker 135 in the event all trunks are busy.

A terminating call is initiated when the marker 135 seizes the frame control circuit 210 through the line link connector 133. When the marker 135 seizes the frame control circuit 210, it supplies thereto the horizontal group and line identities of the called line and also an indication that the call is a terminating call. If the call, for example, is to line 1L00 of the concentrator 100, the horizontal group, vertical group and vertical file indications are all 0. When the circuit 210 registers this information by operating relays 2VF0, 2VG0, 2HG0 and 2 TER, it operates the concentrator control circuit 110 associated with the horizontal group 0 to halt the line scanning and to ready the central office for outpulsing the line and trunk identities to the concentrator 100. The sequence for outpulsing the line and trunk identities is exactly the same as for an originating call. The outpulsing control circuit 123 is operated by the circuit 110 to initiate the trunk and vertical group outpulsing. If the line 1L00 is idle, the outpulsing sequence continues with the line and trunk information being supplied to the concentrator 100.

If, however, the called line 1L00 is busy, the memory circuit 300 disables the outpulsing control circuit 123. The line busy test of the called line 1L00 is initiated in the memory circuit 300 by the frame control circuit. As described above, the memory circuit 300 is checked for both originating and terminating calls. If the called line 1L00 is busy, one of the hold magnets 3M0 is operated to complete a path for operating the circuit 3LBF. The line busy test is similar to the line busy check described above. When relays 2VG0 and 2VF0 operate, ground in FIG. 5 is connected to some of the horizontals of switches 3SWA–F and when relay 2HG0 operates, it selectively connects the verticals associated with the concentrator 100 to the read-out circuits 3MR0–9. If line 1L00 of concentrator 100 is busy being connected to any one of the trunks 1T0–9 of the concentrator 100, the memory read-out circuit associated with the connected trunk is enabled. For example, if trunk 1T0 is connected to line 1L00, the read-out circuit 3MR0 is enabled to cause the operation of the circuit 3LBF. When the circuit 3LBF is set, it disables the outpulsing control circuit 123 to inhibit the outpulsing sequence. When relay 3LB operates, it closes paths, not shown, in the circuit 210 to indicate a busy condition to the marker 135. These paths are described in the above-identified disclosure by Abbott-Krom-Mehring-Whitney. When the marker 135 receives the busy indication it releases the circuit 210 and returns busy tone to the calling subscriber. When the frame control circuit 210 releases, it initiates a release sequence for resetting the central office to normal and for resuming normal scanning. The line concentrator system is, in this manner, returned to normal if the called line 1L00 is busy.

If al trunks available for the called line are busy, the selector 124 provides an indication thereof through the circuit 210 to the marker 135. The marker 135 thereupon releases the circuit 210 to return the central office to normal.

After an originating or a terminating call to line 1L00 is completed, the subscriber at the station 1S00 hangs up to initiate a disconnect sequence for disconnecting the line 1L00 from the trunk to which it is connected. The disconnect sequence is initiated by the trunk switch 120 which detects the disconnect request when the subscriber at the station 1S00 hangs up. The switch 120 supplies an indication that a disconnect request has been initiated to the memory circuit 300. If the memory circuit 300 has a record of the connection, the combination of the request and the record in the memory circuit 300 causes a disconnect operation in the frame control circuit 210. The memory circuit 300 provides an indication to the control circuit 210 of the identity of a line concentrator from which the disconnect request initiated and it operates the disconnect relay 2DIS. The disconnect relay is operated over a path from the circuit 300 through lead 2L2, the normal contacts of relays 2CB, 2D and 3MR3 and the winding of relay 2DIS to battery 2B4. When the circuit 210 receives the disconnect indication in this manner, it seizes the marker 135 through the line link connector 133 for handling the disconnect sequence. More specifically, when relay 2DIS operates, it locks to ground and it operates a relay 2DIS1. The operating path for relay 2DIS1 is from ground through a normal contact of relay 2MPD, an operated contact of relay 2DIS and the winding of relay 2DIS1 to battery 2B4. When relay 2DIS1 operates, it in turn operates the marker preference relay 2CMP over a path from ground through an operated contact of relay 2DIS1 and the winding of relay 2CMP to battery 2B9. When relay 2CMP operates, it opens the operating path for a relay 2RMP to lock out the recorder sampling sequence which is hereinafter described, and it operates a marker lock-out relay 2ML0. The operating path for relay 2ML0 is from ground through the operated contact of relay 2CMP, the winding of relay 2ML0 and resistor 2R1 to battery 2B1. When relay 2ML0 operates, it readies an operating path for a relay 2MPD and it provides a start signal to the marker 135. The start signal is provided from battery 2B13 through resistor 2R7, the operated contact of relay 2CMP and the operated contact of relay 2ML0.

When the marker 135 is seized, it blocks the service of originating or terminating calls thereafter initiated from or to any of the subscriber lines 1L00, etc. during the disconnect sequence and it provides an operating potential for relay 2MPD. The operating path for relay 2MPD is from the connector 133 through a varistor 2V1, shunted by capacitor 2C5, the operated contact of relay 2ML0, a normal contact of relay 2RMP, an operated contact of relay 2CMP and the winding of relay 2MPD to battery 2B3. When relay 2MPD operates, it indicates that the marker 135 has been seized and it releases relay 2DIS1. Relay 2CMP, however, remains operated over a locking path through an operated contact of relay 2DIS. Under control of relay 2MPD, the circuit 210 readies the outpulsing control circuit 123 for an outpulsing sequence to the selected concentrator. The control circuit 210 also provides a start potential from battery 2B2 to the selector circuit 124 for determining the identity of the trunk which is to be disconnected. The trunk selector circuit 124 consults the memory circuit 300, and determines and registers the identity of the trunk to be disconnected. During the trunk identification operation of the selector circuit 124, the control circuit 110 is operated by the frame control circuit 210 to initiate the outpulsing sequence. The circuit 210 readies outpulsing paths from the circuit 123 to the line concentrator 100 and it halts normal scanning.

When the circuit 123 is operated by the circuit 110 and the trunk selection operation is completed at the circuit 124, the outpulsing control circuit 123 functions to supply ten vertical group pulses and trunk identifying pulses to the line concentrator 100. The tenth vertical group pulse functions at the concentrator 100 as an indication that the outpulsing sequence is for disconnect instead of connect. With the trunk 1T0, for example, to be disconnected, only a single trunk identifying pulse is provided to the line concentrator 100. Vertical file pulses are not outpulsed from the circuit 123 to the concentrator 100. The trunk and vertical group outpulsing are started simultaneously so that the last trunk pulse does not arrive after the tenth vertical group pulse. The concentrator 100 has maintained an indication of the identity of the line to which the trunk 1T0 is connected because the crosspoints, not shown, between the line 1L00 and the trunk 1T0 are still operated. After the trunk and vertical group outpulsing is completed, the control circuit 123 supplies a number of mark pulses which function at the concentrator 100 to disconnect the line 1L00 from the trunk 1T0. When the disconnect is completed, a disconnect check pulse is returned to the circuit 123 which initiates a release sequence for returning the circuits 124, 110 and 123 to normal.

When the control circuit 123 receives the disconnect check pulse from the concentrator 100, it causes the memory circuit 300 to erase the record of the connection established from the line 1L00 to the trunk 1T0. The release paths for the magnets 3M0–9 are disclosed in the above-identified disclosure by Abbott-Krom-Mehring-Whitney. When the erasure is complete, a relay 3M3, the winding of which is not shown, in the memory circuit 300 is operated. When relay 3M3 operates, it releases the relay 2DIS which in turn releases relays 2CMP, 2MPD and 2ML0. With relay 2CMP released, the request signal is removed from the marker 135, and with relay 2MPD released, the circuits 123 and 124 are restored to normal.

*Traffic Sampling and Recording*

Periodically, during the operation of the line concentartor system, a clock 4P in the recorder 400 initiates a sequence for sampling the traffic conditions of the subscriber lines 1L00, etc. of one of the line concentrators 100–9. A manual switch 4SWS is set to preselect one of the concentrators 100–9. The clock 4P is energized from an alternating-current source 4AC when a manual switch 4SW is closed. The clock 4P controls the connection of the source 4AC to a tape drive motor 4M and to a timer 4CCS through contact 4P1 of the clock 4P. The contact 4P1 is closed during predetermined recording sessions under control of the clock 4P. With alternating current provided to the timer 4CCS, it initiates the start of a scanning or sampling sequence every 100 seconds. The tape drive motor 4M is energized by the source 4AC but tape movement does not begin until a tape transport solenoid 4TD is energized. The 100-second timer 4CCS successively closes its contacts 4CCS1 and 4CCS2 for a short period every 100 seconds during the recording session. The contact 4CCS1 closes to provide a pulse from ground through a normal contact of the relay 4TA, the closed contact 4CCS1 and a pulse shaping network 4TCN to the input terminal S of a flip-flop circuit 4TCA. When the flip-flop circuit 4TCA is set, it operates an associated relay 4TC, the winding of which is connected between the output terminal of the circuit 4TCA and battery 4B1. When the relay 4TC operates, it closes a path from the source 4AC through the closed clock contact 4P1 and the now operated contact of relay 4TC to the winding of the tape drive solenoid 4TD. When the solenoid 4TD is energized, it causes the tape drive 4M to move a two-track magnetic tape 410 at a tape speed of 3¾ inches per second adjacent an erasing head 4E and two recording heads 4TR1–2. The head 4E, which clears or erases both tracks of the tape 410, is energized over a path from ground through a resistor 4R1 and the winding of the head 4E to the potential source 4B6. The tape 410 may also be erased by a degaussing machine, not shown, instead of the erasing head 4E. The head 4TR1 is positioned to record in one of the two tracks of the tape 410 and the head 4TR2 is positioned to record in the other track of tape 410. As is hereinafter described, the head 4TR1 records signals identifying the lines 1L00, etc. and the head 4TR2 records line busy or traffic information of the lines 1L00, etc.

The escond contact 4CCS2 controlled by the timer 4CCS functions to initiate the scanning sequence. The 100-second timer 4CCS spaces the operation of the two contacts 4CCS1 and 4CCS2 at a sufficient interval to insure that the tape 410 reaches a speed of 3¾ inches per second before recording marks resulting from the operation of the contact 4CCS2 are recorded on the tape 410. When the contact 4CCS2 is closed, a pulse is applied from ground through the normal contact of relay 4TA, the closed contact 4CCS2 and the pulse shaping network 4STN to the input terminal S of the flip-flop circuit 4STA causing it to set.

When the circuit 4STA is set, it operates an associated relay 4ST, the winding of which is connected between the output terminal of the circuit 4STA and the battery 4B3. When the start relay 4ST is operated, it operates a scan counter relay 4SC and it provides a signal to the frame control circuit 210 to indicate that the recorder 400 is ready to sample the line conditions. The operating path for relay 4SC is from ground through an operated contact of relay 4ST, an operated contact of relay 4TC and the winding of relay 4SC to battery 4B8. When relay 4SC operates, it steps a scan counter, not shown, which keeps count of the number of sampling sequences initiated by the recorder 400. The start signal to the circuit 210 is a ground potential which is provided through the normal contact of relay 4TA and the now operated contact of the start relay 4ST. In the frame control circuit 210 the ground potential causes the operation of a marker preference relay 2RMP. The winding of the relay 2RMP is connected on one side to the grounded contact of relay 4ST and on the other side through a normal contact of the preference relay 2CMP to the battery 2B9. If a disconnect is being served at this time, the relay 2CMP is operated to prevent the operation of the relay 2RMP by the recorder 400. The recorder 400 in this manner cannot initiate a sampling sequence if a disconect request is being served by the concentrator system.

When the relay 2RMP operates, it opens a path to the relay 2MPD to delay serving disconnect requests and it operates the marker lockout relay 2ML0 over a path from ground through the operated contact of relay 2RMP, the winding of relay 2ML0 and resistor 2R1 to the battery 2B1. When the relay 2ML0 is operated, it provides a start or seizure indication from battery 2B13 to the marker 135. If an originating or terminating call is being served, the marker 135 locks out the recorder request. In this manner, the recorder 400 is locked out if a marker 135 is serving any request including, as indicated above, disconnect requests. With the line concentrator system normal, the marker 135 is seized and provides an operating potential through varistor 2V1, the operated contact of relay 2ML0, the operated contact of relay 2RMP to the winding of the relay 2RR0 which is also connected to the battery 2B3.

When the relay 2RR0 operates, it readies the control circuit 210 and the recorder 400 for sampling the traffic conditions on lines 1L00, etc. of the concentrator 100. Though, as is hereinafter described, the sampling of the traffic conditions commences as soon as relay 2RR0 operates, the recording sequence does not begin until a reset pulse is received at the recorder 400. The reset pulse is utilized to identify the beginning of the scanning information as the initiation of the sampling and recording sequence by the clock 4P may occur at any time with respect to the scanning cycle.

When the relay 2RR0 is operated, it operates relay 2HG0, it enables gate 3RR0 and disables gate 3RR1, it connects leads 2FC0–4 and 2GC0–9 from the pulse generator circuit 122 to the memory circuit 300 and it completes paths for line busy pulses, reset pulses RS and timing pulses TP3 to the recorder 400. Relay 2HTG0 is operated over a path from ground through the winding of relay 2HG0, the switch 4SWS set at its terminal 0, the now operated contact of relay 2RR0 and resistor 4R1 to battery 4B18. The operation of relay 2HG0 indicates that the sampling sequence is for the lines connected to the concentrator 100. When relay 2HG0 operates, it establishes connections from some of the verticals of each of the switches 3SW0–9, 3SW8A and 3SW9A to the read-out circuits 3MR0–9.

As described above, the sampling pulses to the circuits 3M0–9 are normally provided through the gate 3RR1. The gate 3RR1 is normally enabled and the gate 3RR0 normally disabled by the connection of their control terminals C to battery 3B2. When relay 2RR0 operates, it connects battery 3B1 to enable gate 3RR0 and disable gate 3RR1. The enabled gate 3RR0 completes a path from lead 1TP0 of the generator 122 through gate 3RR0, capacitor 3C0 and the amplifier 3R0 to the read-out circuits 3MR0–9.

In addition to the timing pulses through lead 1TP0, scanning pulses distributed through leads 2FC0–4 and 2GC0–9 are provided to the memory circuit 300 upon the operation of relay 2RR0. Leads 2FC0–4 and 2GC0–9 are connected respectively through varistors 2V20–24 and 2V30–39 to batteries 2B20–24 and 2B30–39. The batteries 2B20–24 and 2B30–39 are also connected respectively through resistors 2R20–24 and 2R30–39 to contacts of relay 2RR0. The pulse generator 122 sucessively provides pulses through leads 2FC0–4 and 2GC0–9. As shown in FIG. 7, ten pulses are provided from the generator 122 to each of the leads 2FC0–4 and one pulse to the leads 2GC0–9 during each operating cycle of the generator 122. The pulses on lead 2FC0 are in the same time slot as the vertical file pulses VF0; on lead 2FC1 in the same time slot as pulses VF1, etc. In other words the scanning pulses from the generator 122 are distributed to leads 2FC0–4 and 2GC0–9 in accordance with their time positions in the scanning cycle. The vertical group pulses on leads 2GC0–9 have a 24-millisecond duration which extends over five vertical file pulses.

The pulses through leads 2FC0–4 and 2GC0–9 function to scan the memory circuit 300 and sample the traffic conditions of the lines 1L00, etc. registered therein. In the memory circuit 300 the leads 2FC0–4 and 2GC0–9 are connected respectively to the normal contacts of relays 2VF0–4 and 2VG0–9 of the circuit 210. If a line is busy the scanning pulses from the generator 122 through the control circuit 210 provide for a busy indication from the memory circuit 300 to the recorder 400 in the time slot corresponding to the busy line. Suppose, for example, that line 1L00 is busy being connected at the concentrator 100 to trunk 1T0. In the memory circuit 300, the hold magnet 3M0 of switch 3SW0 remains operated for the duration of the connection to line 1L00. With relay 2HG0 operated, the pulses on leads 2GC0 and 2FC0 from the circuit 210 provide for a line busy pulse from the amplifier 3LBA to an amplifier 2LBT1 in the control circuit 210. The operation of the memory circuit 300 is exactly the same as for the line busy test and memory check sequences, described above, except that the enabling potentials are not provided through contacts of relays 2VF0 and 2VG0 in FIG. 5. The scanning pulses from the circuit 210 function as the enabling sources for the memory read-out circuits 3MR0–9. With line 1L00 connected to trunk 1T0, the enabling sources or pulses are provided through the switch 3SW0 and contacts of relay 2HG0 to leads A and B of the circuit 3MR0. The pulse through lead 2GC0 is provided through cable 2C3, level L0 of switch 3SWA, the operated crosspoint at the left on level L0, an operated contact of relay 2HG0 to lead A of circuit 3MR0. The pulse through lead 2FC0 is provided through cable 2C3, the upper level L9 of switch 3SWA, the operated crosspoint near the left on level L9 and an operated contact of relay 2HG0 to lead B of circuit 3MR0. The circuit 3MR0 is enabled to provide a read-out path from the amplifier 3R0 to the amplifier 3LBA. The line busy pulse for line 1L00 is provided from the amplifier 3LBA in the circuit 300 through the amplifier 2LBT1 in the circuit 210, a transformer 276, operated contacts of relay 2RR0 and a signaling pair 4S3 to the recorder 400. The primary winding of the transformer 2T6 is biased by a battery 2B18. The signaling pair 4S3 is one of three signaling pairs 4S1–3 connecting the control circuit 210 to the recorder 400. The reset, timing and line busy pulses are transmitted over balanced pairs of wires to minimize the disturbances during transmission between the frame control circuit 210 and the recorder 400. The signaling pair 4S1 is for reset pulses from the generator 122 and the signaling pair 4S2 is for timing pulses TP3 from the generator 122. As shown in FIG. 7, one timing pulse TP3 is provided for each of the lines 1L00, etc. during a scanning cycle.

When relay 2RR0 is operated to indicate that marker lockout has taken place, the signaling paths through the pairs 4S1–3 are completed. As indicated above, line busy pulses through the signaling pair 4S3 are not recorded until after a reset pulse is received at the recorder 400. The reset pulse functions to synchronize the recorder 400 with the pulse generator 122 so that the recording sequence commences at the beginning of the scanning cycle. The first reset pulse received after relay 2RR0 operates is provided through the cable 2C4 and the amplifier 2RS to the primary winding of a transformer 2T4 which is also connected to the battery 2B11. The secondary of the transformer 2T4 is connected through operated contacts of the relay 2RR0, the signaling pair 4S1, the transformer 4T1 in the recorder 400 and a normal contact of relay 4AT to an amplifier 4RP. The reset pulse amplitudes are stepped down at the transmitting transformer 2T4 and stepped up at the recorder receiving transformer 4T1. The amplitude of the pulses received by the recorder at the output of the transformer 4T1 and the transformers 4T2 and 4T3 as well is approximately 10 volts. The amplifier 4RP converts the 10-volt pulses from the transformer 4T1 to pulses having an amplitude of 16 volts and a duration of 0.1 millisecond. The first reset pulse received at the amplifier 4RP is provided through two enabled gates 4LSB and 4LSA to the input terminal S of a flip-flop circuit 4LS causing it to set. The gate 4LSA is enabled when relay 2RR0 operates. The enabling path is from ground through an operated contact of relay 2HG0, an operated contact of relay 2RR0, a normal contact of relay 4TA and the pulse shaping network 4ALMN to the control terminal C of the gate 4LSA.

When the flip-flop circuit 4LS is set by the first reset pulse, it enables three gates 4TR0, 4TRG and 4RS1 and it disables or inhibits the gate 4LSB. When the gates 4TR0 and 4TRG are enabled, paths are completed from the signaling pairs 4S2–3 to the recording heads 4TR1 and 4TR2. Until the gates 4TR0 and 4TRG are enabled the timing pulses through the pair 4S2 and the line busy pulses through the pair 4S3 are blocked. The timing pulses are provided from the generator 122 through cable 2C4 and the amplifier 2VFT1 to the primary winding of transformer 2T5 which is also connected to battery 2B12. The pulses from the secondary of transformer 2T5 are coupled through operated contacts of relay 2RR0, the signaling pair 4S2, the transformer 4T2, a normal contact of relay 4TA, the amplifier 4VF, another normal contact of relay 4TA, the now enabled gate 4TRG, the regenerative pulse amplifier 4TRA and the recording or writing amplifier 4WR1 to the writing head 4TR1. The first reference mark or signal recorded by the head 4TR1 identifies the line 1L00. For each line scan made at 100-second intervals, fifty reference marks are recorded by the head 4TR1 and a maximum of ten line busy marks are recorded by the head 4TR2. A maximum of ten line busy marks can be recorded because the concentrator 100 is connected to the central office by only ten trunks. With line 1L00 busy at the beginning of the sampling interval, a line busy signal is provided through the pair 4S3 at substantially the same time a timing pulse is provided through the pair 4S2. The line busy pulse is provided through the pair 4S3, transformer 4T3, a normal contact of relay 4TA, amplifier 4BRP, another normal contact of relay 4TA, the enabled gate 4TR0, a regenerative pulse amplifier 4TRB and a writing amplifier 4WR2 to the head 4TR2. The head 4TR1 writes the line identifying marks on one track of the tape 410 and the head 4TR2 writes a busy mark on the other track of tape 410. The recording sequence continues in this manner until fifty identifying or reference marks have been recorded and the next or second reset pulse is received at the recorder 400.

The second reset pulse is provided through amplifier 4RP and the enabled gate 4RS1 to the cut-off amplifier 4SEF which resets the flip-flop circuits 4TCA, 4STA and 4LS. The reset pulse from the amplifier 4RP is not provided to the input terminal S of the flip-flop circuit 4LS due to the inhibition of the gate 4LSB. When the flip-flop circuit 4TCA is reset, the relay 4TC is released to in turn release the tape drive solenoid 4TD. The second reset pulse therefore functions to stop the movement of the tape 410. When the flip-flop circuit 4STA is reset, it releases the relay 4ST to remove a start potential from the frame control circuit 210. When the start potential is removed, it indicates that the sampling sequence by the recorder 400 is completed by allowing the relay 2RMP to release. When relay 2RMP releases, it removes the start or seizure potential from the marker 135 and it releases relays 2ML0 and 2RR0. When the relay 2RR0 releases, it returns the circuits 210 and 300 and the recorder 400 to normal. More specifically, relay 2RR0 releases relay 2HG0 and opens the pairs 4S1–3 and the scanning leads 2FC0–4 and 2GC0–9. Relay 2RR0 also enables gate 3RR1 and disables gates 3RR0 and 4LSA.

When the circuit 4LS in the recorder 400 resets, it inhibits gates 4TRG and 4TR0 in the signaling paths for the timing pulses and line busy pulses.

With the relay 2RR0 released to restore the recorder 400 to normal, marker lockout is discontinued so that originating and terminating calls and disconnects can be handled by the marker 135. The entire sampling and recording sequence has a duration between 240 milliseconds, the scanning cycle duration, and 480 milliseconds depending upon when during the cycle the sampling sequence is initiated. The maximum duration of the marker lockout is therefore 480 milliseconds. The maximum lockout duration occurs when relay 2RR0 operates immediately after a reset pulse is provided by the generator 122. Recording of the reference and busy marks awaits the next reset pulse.

In the event marker lockout is not terminated after a predetermined interval, an alarm condition is indicated and the recorder 400 is electrically isolated from the circuit 210 so that marker lockout is terminated. If marker lockout is not terminated because of a trouble condition, connections to the lines 1L00, etc. cannot be set up or disconnected. It is desirable, therefore, to avoid such a condition.

When relay 2RR0 operates to enable the gate 4LSA for the first reset pulse, the same enabling path operates the timing amplifier 4TB. After 0.7 of a second the amplifier 4TB provides an operating pulse to the set terminal S of the alarm flip-flop circuit 4ALM. When the circuit 4ALM is set, it operates the relay 4TA, the winding of which is connected to the battery 4B11. When the alarm relay 4TA locks operated through a resistor 4RA, the normal manual release key 4RLS, an operated contact of relay 4TA and the normal manual scan test key 4SCTG to ground, it isolates the recorder 400 by opening the signaling paths through pairs 4S1–3, it connects ground to operate the reset amplifier 4SEF to reset the circuits 4LS, 4TCA and 4STA and it opens the operating path for relay 2RMP causing it to release and in turn release relay 2RR0. When relay 2RR0 releases, it removes the seizure potential from the marker 135 and it restores the circuits 210 and 300 and the recorder 400 to normal except for the alarm indication. When relay 4TA operates, it energizes a lamp 4TST over a path from ground though the lamp 4TST and the contact of relay 4TA to battery 4B5. The circuit 4ALM remains set, the relay 4TA remains operated and the lamp 4TST remains energized until the manual release key 4RLS is operated. The operated key 4RLS connects battery 4B4 to the reset terminal R of the circuit 4ALM and it opens a locking path for relay 4TA.

The sequence for preventing excessive marker lockout is initiated when relay 2RR0 is operated. In the event a fault occurs before relay 2RR0 operates, a thermal relay 4TH is operated. Relay 4TH operates if relay 4TC remains operated for five seconds. The operating path for relay 4TH is from ground through a normal contact of relay 4TH, and operated contact of relay 4TC and the winding of relay 4TH to the battery 4B17. When relay 4TH operates, it in turn operates relay 4TA over a path from ground through an operated contact of relay 4TH, the normal key 4RLS, resistor 4RA and the winding of relay 4TA to battery 4B11. When relay 4TA operates, it locks to ground through the normal key 4SCTG, it releases relay 4TH and it provides a reset pulse to the circuits 4TCA, 4STA and 4LS. The relay 4TA remains operated energizing the lamp 4TST until the manual release key 4RLS is operated.

The alarm indication due to the operation of relay 4TH is provided to prevent continuous tape movement which would result as long as relay 4TC remains operated The manual key 4SCTG is provided to operate relay 4TA to isolate the recorder 400 so that a manual check can be made of its operation. With relay 4TA operated by the key 4SCTG, three keys 4RSK, 4TCK and 4STK may be operated to simulate respectively the reset pulse and the operation of the clock contacts 4CCS1 and 4CCS2. A manual key 4TR may also be operated to connect a battery 4B10 to the 260-pulse per second generator 4PG. The generator 4PG simulates the timing and line busy pulses.

It is to be understood that the above-described arrangements are illustrative of the application of the principles of this invention. Numerous other arrangements may be devised by those skilled in the art without departing from the spirit and scope of the invention.

What is claimed is:

1. In an automatic telephone system wherein a line concentrator is utilized to connect a large plurality of subscriber lines through a small plurality of trunks to a central office, a line scanning system for determining the service condition of said lines including a scanning pulse generator at said central office; means including said line concentrator controlled by said scanning system for establishing connections between said lines and said trunks; a memory circuit at said central office and controlled by said connection establishing means for registering the identity of busy lines; means for periodically halting said scanning system; means effective when said scanning system is halted for connecting said scanning pulse generator to said memory circuit whereby the traffic conditions of said lines are sampled; and means controlled by said generator connecting means for permanently recording said sampled traffic conditions.

2. A traffic recorder for sampling and recording the traffic conditions of subscriber lines in a line concentrator telephone system comprising first means for establishing and releasing connections to said subscriber lines, a memory circuit controlled by aid first means for registering the identity of busy ones of said lines, second means connected in a mutual lockout relationship with said first means for periodically scanning said memory circuit to determine the identity of said busy lines registered thereby, and means controlled by said scanning means for permanently recording a coded representation of the condition of each of said subscriber lines.

3. In a telephone system a plurality of lines, a central office, a plurality of trunks extending from said central office, means for establishing connections between said lines and said trunks, first means for scanning each of said lines to determine its service condition and for providing an indication of the determined condition to said central office, means controlled by said first means for operating said connection establishing means to connect service requesting ones of said lines to idle ones of said trunks, memory means at said central office controlled by said operating means for maintaining a record of the connections established between said lines and said trunks, second means at said central office for periodically scanning said memory means to determine the service condition of each of said lines, said memory means during said periodic scanning being unaffected by the operation of said operating means, and means controlled by said second means for permanently recording a coded representation of the service condition of each of said lines.

4. In a telephone system wherein a large number of subscriber lines are connected by a remote concentrator unit to a small number of trunks extending from a central office, a memory circuit at said central office for maintaining a continuous record of the connections established through said concentrator unit, circuit means including means for scanning said memory circuit to determine the traffic condition of each of said lines, said circuit means being in a mutual lockout arrangement with said concentrator unit, and means controlled by said scanning means for permanently recording a representation of the determined conditions.

5. In a telephone system, a plurality of lines, a plurality of trunks, means for establishing connections between said lines and said trunks, a memory circuit for maintaining a record of the connections established between said lines and said trunks by said connection establishing means, means for disconnecting said established connections, means controlled by said disconnecting means for controlling said memory circuit to erase the record of a disconnected connection, said memory circuit including at least one crosspoint for each of said trunks, means for operating any one of said crosspoints when a connection is to be established through the associated one of said trunks by said connection establishing means, means for periodically supplying sampling pulses to each of said crosspoints to determine the identity of busy ones of said lines, and means controlled by said periodic supplying means for permanently recording a coded representation of the identity of said identified busy lines.

6. In combination, a plurality of subscriber lines, a central office, a plurality of trunks connected to said central office, means for establishing connections between said lines and said trunks, means for supplying signals indicating the condition of each of said lines from said connection establishing means to said central office, means at said central office controlled by said supplying means for operating said connection establishing means, and means at said central office including a line condition memory circuit and means for scanning said memory circuit for periodically determining the condition of each of said lines, said determining means and said supplying means being in a mutual lockout arrangement.

7. In combination, a plurality of subscriber lines, a central office, a plurality of trunks connected to said central office, means for establishing connections between said lines and said trunks, means for supplying signals indicating the condition of each of said lines from said connection establishing means to said central office, means at said central office controlled by said supply means for operating said connection establishing means, means at said central office for maintaining a record of the connections established between said lines and said trunks, means at said central office including said record maintaining means for periodically determining the condition of each of said lines exclusively through reference to said record maintaining means, means controlled by said determining means for periodically recording a coded representation of the condition of each of said lines, and means effective during the operation of said periodic determining means for inhibiting the operation of said connection establishing means by said operating means.

8. In combination, a plurality of subscriber lines, a central office, a plurality of trunks connected to said central office, means for establishing connections between said lines and said trunks, means for supplying signals indicating the condition of each of said lines from said connection establishing means to said central office, means at said central office controlled by said supply means for operating said connection establishing means, means at said central office for maintaining a temporary record of the connections established between said lines and said trunks, means at said central office including said record maintaining means for periodically determining the condition of each of said lines connection establishing means, means controlled by said determining means for permanently recording a coded representation of the condition of each of said lines, means effective during the operation of said periodic determining means for inhibiting the operation of said connection establishing means by said operating means, and means effective during the operation of said connection establishing means for inhibiting the operation of said periodic determining means.

9. In combination, a plurality of subscriber lines, a central office, a plurality of trunks connected to said central office, means for establishing connections between said lines and said trunks, means for supplying signals indicating the condition of each of said lines from said connection establishing means to said central office, means at said central office controlled by said supply means for operating said connection establishing means, means including a memory circuit at said central office and operative through reference to said memory circuit for periodically determining the condition of each of said lines, means controlled by said determining means for permanently recording a coded representation of the condition of each of said lines, means effective during the operation of said periodic determining means for inhibiting the operation of said connection establishing means by said operating means, and means for automatically disabling said inhibiting means after a predetermined inhibition interval thereby independent of the operating condition of said periodic determining means.

References Cited in the file of this patent

UNITED STATES PATENTS

| | | |
|---|---|---|
| 2,715,656 | Andrews | Aug. 16, 1955 |
| 2,723,311 | Malthaner et al. | Nov. 8, 1955 |
| 2,853,555 | Abbott et al. | Sept. 23, 1958 |
| 2,894,072 | Abbott et al. | July 7, 1959 |